(12) United States Patent
Butcher et al.

(10) Patent No.: US 10,115,375 B2
(45) Date of Patent: Oct. 30, 2018

(54) SYSTEMS AND METHODS FOR ENABLING A SYSTEMS MANAGEMENT INTERFACE WITH AN ALTERNATE FRAME BUFFER

(71) Applicant: Dell Products L.P., Round Rock, TX (US)

(72) Inventors: Wade Andrew Butcher, Cedar Park, TX (US); Timothy M. Lambert, Austin, TX (US); Johan Rahardjo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/943,343

(22) Filed: Nov. 17, 2015

(65) Prior Publication Data

US 2017/0140739 A1   May 18, 2017

(51) Int. Cl.
*G09G 5/39* (2006.01)
*G06F 3/06* (2006.01)
*G06F 3/14* (2006.01)
*G09G 5/399* (2006.01)

(52) U.S. Cl.
CPC ............ *G09G 5/39* (2013.01); *G06F 3/0604* (2013.01); *G06F 3/0656* (2013.01); *G06F 3/0673* (2013.01); *G06F 3/1454* (2013.01); *G06F 3/1423* (2013.01); *G09G 5/399* (2013.01); *G09G 2330/027* (2013.01); *G09G 2340/0407* (2013.01)

(58) Field of Classification Search
CPC ...... G09G 5/39; G09G 5/363; G09G 2360/12; G09G 2360/18; G09G 2354/00; G09G 2330/027; G09G 2340/0407; G09G 5/399; G06F 3/0604; G06F 3/0656; G06F 3/0673; G06F 3/1438; G06F 3/1423; G06F 3/1454
See application file for complete search history.

(56) References Cited

U.S. PATENT DOCUMENTS

| 8,823,722 | B1 * | 9/2014 | Huang | G09G 5/395 |
| | | | | 345/5 |
| 2005/0068311 | A1 * | 3/2005 | Fletcher | G06F 1/3218 |
| | | | | 345/211 |
| 2008/0303946 | A1 * | 12/2008 | Cox | G09G 5/006 |
| | | | | 348/552 |

(Continued)

*Primary Examiner* — Ke Xiao
*Assistant Examiner* — Kim-Thanh T Tran
(74) *Attorney, Agent, or Firm* — Jackson Walker L.L.P.

(57) ABSTRACT

A method may include in response to determining a host system is off, configuring a video controller of an information handling system including setting a display resolution of the video controller and writing management video data associated to a primary frame buffer such that management video data is able to be retrieved by the video controller for output to one or both of a first display associated with the host system and a second display of a management interface communicatively coupled to a management controller communicatively coupled to the processor and the memory and configured to provide out-of-band management of the information handling system. The method may further include in response to determining the host system is on, writing the management video data to an alternate frame buffer such that management video data is able to be retrieved by the video controller for output to the second display.

18 Claims, 2 Drawing Sheets

(56) References Cited

U.S. PATENT DOCUMENTS

| | | | |
|---|---|---|---|
| 2010/0137035 A1* | 6/2010 | Shan | G06F 1/3293 |
| | | | 455/566 |
| 2011/0260948 A1* | 10/2011 | Teng | G06F 1/1613 |
| | | | 345/1.1 |
| 2014/0206416 A1* | 7/2014 | Aurongzeb | H04W 88/02 |
| | | | 455/566 |
| 2016/0080468 A1 | 3/2016 | Lambert et al. | |
| 2016/0275037 A1 | 9/2016 | Dube et al. | |

* cited by examiner

SYSTEMS AND METHODS FOR ENABLING A SYSTEMS MANAGEMENT INTERFACE WITH AN ALTERNATE FRAME BUFFER

TECHNICAL FIELD

The present disclosure relates in general to information handling systems, and more particularly to methods and systems for enabling a systems management interface of an information handling system using an alternate video frame buffer.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a management controller for providing out-of-band management facilities for management of the information handling system. Such management may be made by the management controller even if the information handling system is powered off or powered to a standby state, as a management controller may include an out-of-band network separate from and physically isolated from an in-band network interface of the information handling system. Such management controllers may include or may be an integral part of a baseboard management controller (BMC), a remote access controller (e.g., a Dell Remote Access Controller of Integrated Dell Remote Access Controller), an enclosure controller, or a chassis management controller (CMC).

In fact, management via a keyboard/video/mouse (KVM) crash cart may interface with a management controller via Universal Serial Bus (USB) and Video Graphics Array (VGA) interfaces. Crash carts historically can only interface with host system video and are not able to provide active management controller data or video while the host system is on or off. However, it may be desirable to enable systems management of a management controller through a KVM interface.

SUMMARY

In accordance with the teachings of the present disclosure, the disadvantages and problems associated with existing approaches to systems management of an information handling system may be reduced or eliminated.

In accordance with embodiments of the present disclosure, an information handling system may include a processor, a memory, a video controller for controlling display of video data stored in the memory, and a management controller communicatively coupled to the processor and the memory and configured to provide out-of-band management of the information handling system. The management controller may be configured to determine whether a host system comprising the processor is on. The management controller may also be configured to in response to determining the host system is off, configure the video controller, including setting a display resolution of the video controller, and write management video data associated to a primary frame buffer of the memory such that management video data is able to be retrieved by the video controller for output to one or both of a first display associated with the host system and a second display of a management interface communicatively coupled to the management controller. The management controller may further be configured to in response to determining the host system is on, write the management video data to an alternate frame buffer of the memory such that management video data is able to be retrieved by the video controller for output to the second display.

In accordance with these and other embodiments of the present disclosure, a method may include determining whether a host system of an information handling system is on. The method may also include in response to determining the host system is off, configuring a video controller of the information handling system including setting a display resolution of the video controller and writing management video data associated to a primary frame buffer of a memory of the information handling system such that management video data is able to be retrieved by the video controller for output to one or both of a first display associated with the host system and a second display of a management interface communicatively coupled to a management controller communicatively coupled to the processor and the memory and configured to provide out-of-band management of the information handling system. The method may further include in response to determining the host system is on, writing the management video data to an alternate frame buffer of the memory such that management video data is able to be retrieved by the video controller for output to the second display.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to: (i) determine whether a host system of an information handling system is on; (ii) in response to determining the host system is off, configure a video controller of the information handling system including setting a display resolution of the video controller and write management video data associated to a primary frame buffer of a memory of the information handling system such that management video data is able to be retrieved by the video controller for output to one or both of a first display associated with the host system and a second display of a management interface communicatively coupled to a management controller communicatively coupled to the processor and the memory and configured to provide out-of-band management of the information handling system; and (iii) in response to determining the host system is on, write the management video data to an alternate frame buffer of the memory such that management video data is able to be retrieved by the video controller for output to the second display.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
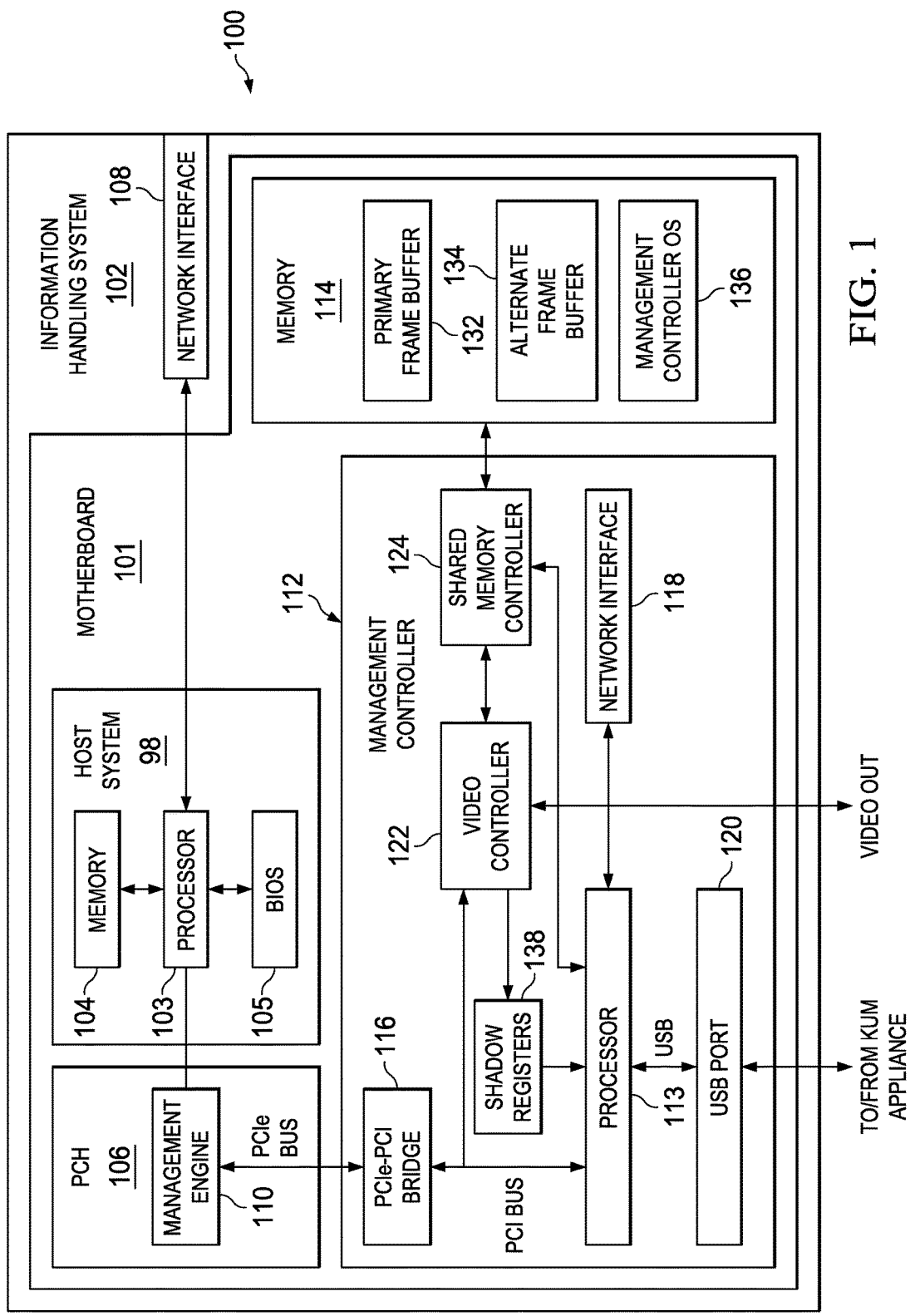
FIG. 1 illustrates a block diagram of an example information handling system, in accordance with embodiments of the present disclosure.
Figure 2:
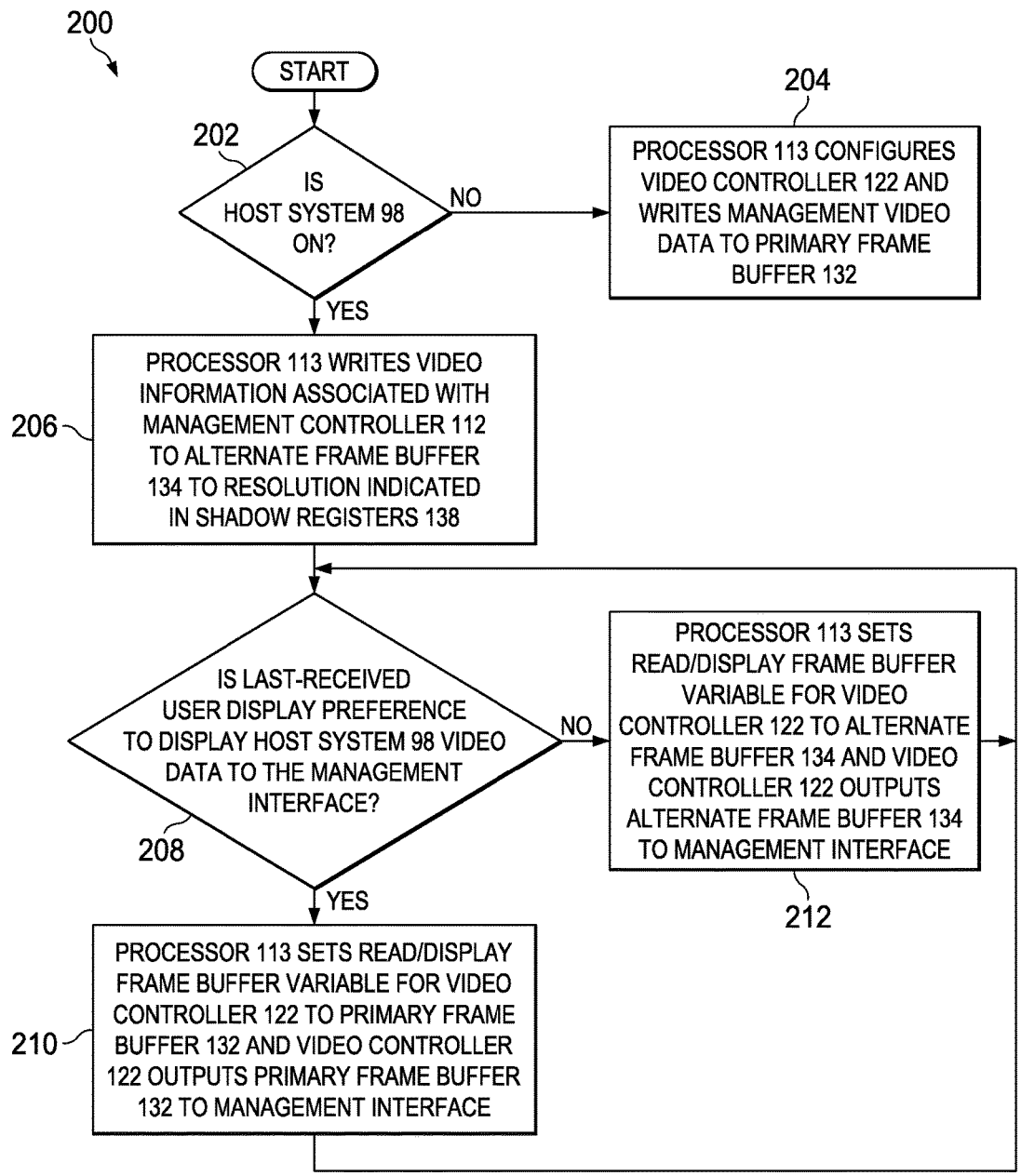
FIG. 2 illustrates a flow chart of an example method for enabling a systems management interface with an alternate frame buffer, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101 and a network interface 108 communicatively coupled to a processor 103 of motherboard 101.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include processor 103, a memory 104 communicatively coupled to processor 103, a platform controller hub (PCH) 106 communicatively coupled to processor 103, a management controller 112 communicatively coupled to processor 103, and a memory 114 communicatively coupled to management controller 112.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. Although memory 104 is depicted in FIG. 1 as integral to motherboard 101, in some embodiments, all or a portion of memory 104 may reside external to motherboard 101.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

In operation, processor 103, memory 104, and BIOS 105 may comprise at least a portion of a host system 98.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. One such function may include management engine 110. Management engine 110 may comprise hardware and/or firmware that enables remote out-of-band management for information handling system 102 in order to monitor, maintain, update, upgrade, and/or repair information handling system 102. In some embodiments, management engine 110 may include hardware and firmware compliant with Intel's Active Management Technology.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC). As shown in FIG. 1, management controller 112 may comprise a processor 103, a Peripheral Component Interconnect Express (PCIe)-to-Peripheral Component Interconnect (PCI) bridge 116, a network interface 118, a Universal Serial Bus (USB) port 120, a video controller 122, a shared memory controller 124, and shadow resisters 138.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor may be communicatively coupled to PCIe-to-PCI bridge 116 via a PCI bus.

PCIe-to-PCI bridge 116 may provide an interface between a PCIe bus communicatively coupled to PCH 106 and a PCI bus internal to management controller 112 and communicatively coupled to processor 113 and video controller 122. PCIe-to-PCI bridge 116 may comprise any suitable system, apparatus, or device operable to translate bus communications from PCIe to PCI or vice versa, in order to facilitate communication between components coupled to the PCIe bus (e.g., PCH 106) and components coupled to the PCI bus (e.g., processor 103, video controller 122).

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

USB port 120 may comprise any system, device, and apparatus configured to receive an external device and electrically couple such external device to management controller 112. For example, USB port 120 may comprise a connector configured to receive a corresponding connector of a USB device (e.g., a KVM device). Although a USB port 120 is depicted in FIG. 1, in some embodiments an input/output port other than a USB port may be utilized. As shown in FIG. 1, USB port 120 may be communicatively coupled to processor 113 via a USB bus.

Video controller 122 may be a specialized electronic circuit or system designed to process data from host system 98 and/or processor 113 to accelerate the building of images in one or more frame buffers (which may be stored in memory 114) intended for output to a display (e.g., a standard display of host system 98 and/or a KVM appliance communicatively coupled to video controller 122). Video controller 122 may include or be coupled to a video processing engine that executes various video processing functions, including for example video capture, calculating differences between video frames, and video data compression. As shown in FIG. 1, video controller 122 may be communicatively coupled to PCIe-to-PCI bridge 116 and/or processor 113 via a PCI bus.

Shared memory controller 124 may be coupled to embedded processor 113, video controller 122, and memory 114 and may be any system, device, or apparatus configured to control the flow of data between memory 114 and each of processor 113 and video controller 122, as video controller 122 and processor 113 may share the memory resources of memory 114.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, memory 114 may include a primary frame buffer 132 and an alternate frame buffer 134.

Primary frame buffer 132 may comprise a portion of memory 114 comprising a bitmap that may be driven to a video display from a memory buffer containing a complete frame of video data. For example, the information in frame buffer 132 typically may comprise color values for every pixel to be displayed on a display device. In operation, primary frame buffer 132 may store display data associated with an operating system or other executable instructions executing on host system 98.

Alternate frame buffer 134 may comprise a portion of memory 114 comprising a bitmap that may be driven to a video display from a memory buffer containing a complete frame of video data. For example, the information in frame buffer 134 typically may comprise color values for every pixel to be displayed on a display device. In operation, alternate frame buffer 134 may store display data associated with an operating system (e.g., management controller operating system 136) or other executable instructions executing on processor 113.

Also as shown in FIG. 1, memory 114 may have stored thereon management controller operating system 136. Management controller operating system 136 may comprise any program of executable instructions, or aggregation of programs of executable instructions, configured for carrying out the functionality of management controller 112. Active portions of management controller operating system 136 may be loaded from memory 114 for execution by processor 113. In some embodiments, management controller operating system 136 may comprise firmware.

Network interface 108 may comprise any suitable system, apparatus, or device operable to serve as an interface between information handling system 102 and/or one or more other information handling systems. Network interface 108 may enable information handling system 102 to communicate using any suitable transmission protocol and/or standard. In these and other embodiments, network interface 108 may comprise a network interface card, or "NIC."

Shadow registers 138 may comprise one or more memory registers for which video controller 122 may write information indicating video configuration information (e.g., display resolution) for host system 98. In operation, processor 113 may read such configuration information in order to enable systems management via alternate frame buffer 134, as described in greater detail below.

In operation, BIOS 105 and/or an operation system executing on processor 103 may configure video controller 122 and write video data to primary frame buffer 132. Video controller 122 may read from primary frame buffer 132 to display video to one or more display devices for host system 98 and/or may output video data from primary frame buffer 132 to a KVM appliance coupled to management controller 112.

Further, when host system 98 is off, and a user interfaced with management controller 112 (e.g., via a KVM appliance) invokes an on-screen display, processor 113 may configure video controller 122 (e.g., configure display resolution) and may write management video data to primary frame buffer 132. Accordingly, such video data may be retrieved by video controller 122 for output to either a "local" display of host system 98 or to the "remote" display of the KVM appliance or other management interface.

On the other hand, when host system 98 is on, processor 113 may read video configuration information (e.g., display resolution) of host system 98 from shadow registers 138 and processor 113 may write video information associated with management controller 112 to alternate frame buffer 134 at the resolution indicated in shadow registers 138. Concurrently, video controller 122 may continue writing video data for host system 98 to primary frame buffer 132.

A user of the management interface (e.g., a KVM appliance) may toggle (e.g., by entering a keystroke or other command) between display of video data associated with host system 98 stored in primary frame buffer 132 or video data associated with management controller 112 stored in alternate frame buffer 134. When indicating a desire to view the management video data associated with management controller 112, processor 113 may set a read/display frame buffer variable for video controller 122 to alternate frame buffer 134 and video controller 122 may output alternate frame buffer 134 to the management interface. On the other hand, when indicating a desire to view the video data associated with host system 98, processor 113 may set a read/display frame buffer variable for video controller 122 to primary frame buffer 132 and video controller 122 may output primary frame buffer 132 to the management interface.

Accordingly, using the system described above, a management interface communicatively coupled to a management controller (e.g., a KVM appliance) may provide a management on-screen display allowing a user to configured settings, orchestrate provisioning tasks, view logs, have command-line interface control, and toggle such on-screen display on or off. In some embodiments, the system described above may also enable a user to initiate a peer-to-peer remote KVM session to another information handling system communicatively connected to information handling system 102 via a network.

FIG. 2 illustrates a flow chart of an example method for enabling a systems management interface with an alternate frame buffer, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, processor 113 may determine whether host system 98 is on or off. If host system 98 is off, method 200 may proceed to step 204. Otherwise, method 200 may proceed to step 206.

At step 204, in response to host system 98 being off, processor 113 may configure video controller 122 (e.g., configure display resolution) and may write management video data to primary frame buffer 132. Accordingly, such video data may be retrieved by video controller 122 for output to either a "local" display of host system 98 or to the "remote" display of a management interface communicatively coupled to management controller 112.

At step 206, in response to host system 98 being on, processor 113 may write video information associated with management controller 112 to alternate frame buffer 134 at the resolution indicated in shadow registers 138. Concurrently, video controller 122 may continue writing video data for host system 98 to primary frame buffer 132.

At step 208, processor 113 may determine whether a last-received user display preference (e.g., keystroke) indicates a preference to display host system 98 video data to the management interface or display management controller 112 management video data to the management interface. If a preference to display host system 98 video data to the management interface, method 200 may proceed to step 210. Otherwise, if a preference to display management controller 112 management video data to the management interface, method 200 may proceed to step 212.

At step 210, processor 113 may set a read/display frame buffer variable for video controller 122 to primary frame buffer 132 and video controller 122 may output primary frame buffer 132 to the management interface. After completion of step 210, method 200 may proceed again to step 208.

At step 212, processor 113 may set a read/display frame buffer variable for video controller 122 to alternate frame buffer 134 and video controller 122 may output alternate frame buffer 134 to the management interface. After completion of step 212, method 200 may proceed again to step 208.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
  a host system that includes:
    a processor;
    a memory; and
    a video controller for controlling display of video data stored in the memory; and
  a management controller communicatively coupled to the processor and the memory and configured to provide out-of-band management of the host, and further configured to:
    determine whether the host system is on or off;
    in response to determining the host system is off, configure the video controller, including setting a display resolution of the video controller, and write management video data to a primary frame buffer of the memory such that the management video data is able to be retrieved by the video controller for output to a first display associated with the host system; and
    in response to determining the host system is on, write the management video data to an alternate frame buffer of the memory such that the management video data is able to be retrieved by the video controller for output to a second display of a management interface communicatively coupled to the management controller, wherein host system video data is configured to be written to the primary frame buffer for output to the first display, and wherein the management interface is configured to allow a user selection between the host system video data in the primary frame buffer and the management video data in the alternate frame buffer for output to the second display.

2. The information handling system of claim 1, wherein the video controller is configured to write the host system video data to the primary frame buffer concurrently with the management controller writing the management video data to the alternate frame buffer.

3. The information handling system of claim 1, wherein the management controller is further configured to:
  when the host system is on, determine display configuration parameters including the display resolution for the host system video data associated with the host system; and
  write the management video data to the alternate frame buffer in accordance with the display configuration parameters.

4. The information handling system of claim 1, wherein the management controller is configured to receive from the management interface an indication of a user preference to display to the management interface the host system video data or the management video data.

5. The information handling system of claim 4, wherein the management controller is configured to set a read/display frame buffer for the video controller to the primary frame buffer in response to the indication indicating a preference to display the host system video data to the management interface.

6. The information handling system of claim 4, wherein the management controller is configured to set a read/display frame buffer for the video controller to the alternate frame buffer in response to the indication indicating a preference to display the management video data to the management interface.

7. A method comprising:
  determining whether a host system of an information handling system is on or off, wherein the host system is a computer system comprising a processor;
  in response to determining the host system is off, configuring a video controller of the information handling system including setting a display resolution of the video controller and writing management video data to a primary frame buffer of a memory of the information handling system such that the management video data is able to be retrieved by the video controller for output to a first display associated with the host system; and
  wherein the information handling system is configured to, in response to a determination that the host system is on, write the management video data to an alternate frame buffer of the memory such that the management video data is able to be retrieved by the video controller for output to a second display of a management interface communicatively coupled to a management controller communicatively coupled to the processor and the memory and configured to provide out-of-band management of the host system, wherein host system video data is configured to be written to the primary frame buffer for output to the first display, and wherein the management interface is configured to allow a user selection between the host system video data in the primary frame buffer and the management video data in the alternate frame buffer for output to the second display.

8. The method of claim 7, wherein the video controller is configured to write the host system video data to the primary frame buffer concurrently with the management controller writing the management video data to the alternate frame buffer.

9. The method of claim 7, further comprising:
when the host system is on, determining display configuration parameters including the display resolution for the host system video data associated with the host system; and
writing the management video data to the alternate frame buffer in accordance with the display configuration parameters.

10. The method of claim 7, further comprising receiving from the management interface an indication of a user preference to display to the management interface the host system video data or the management video data.

11. The method of claim 10, further comprising setting a read/display frame buffer for the video controller to the primary frame buffer in response to the indication indicating a preference to display the host system video data to the management interface.

12. The method of claim 10, further comprising setting a read/display frame buffer for the video controller to the alternate frame buffer in response to the indication indicating a preference to display the management video data to the management interface.

13. An article of manufacture comprising:
a non-transitory computer-readable medium; and
computer-executable instructions carried on the computer-readable medium, the instructions readable by a processor, the instructions, when read and executed, for causing the processor to:
determine whether a host system of an information handling system is on or off, wherein the host system is a computer system comprising a host system processor;
in response to determining the host system is off, configure a video controller of the information handling system including setting a display resolution of the video controller and write management video data to a primary frame buffer of a memory of the information handling system such that the management video data is able to be retrieved by the video controller for output to a first display associated with the host system; and
in response to determining the host system is on, write the management video data to an alternate frame buffer of the memory such that the management video data is able to be retrieved by the video controller for output to a second display of a management interface communicatively coupled to a management controller and configured to provide out-of-band management of the host system, wherein host system video data is configured to be written to the primary frame buffer for output to the first display, and wherein the management interface is configured to allow a user selection between the host system video data in the primary frame buffer and the management video data in the alternate frame buffer for output to the second display.

14. The article of claim 13, wherein the video controller is configured to write the host system video data to the primary frame buffer concurrently with the management controller writing the management video data to the alternate frame buffer.

15. The article of claim 13, the instructions for further causing the processor to:
when the host system is on, determine display configuration parameters including the display resolution for the host system video data associated with the host system; and
write the management video data to the alternate frame buffer in accordance with the display configuration parameters.

16. The article of claim 13, the instructions for further causing the processor to receive from the management interface an indication of a user preference to display to the management interface the host system video data or the management video data.

17. The article of claim 16, the instructions for further causing the processor to set a read/display frame buffer for the video controller to the primary frame buffer in response to the indication indicating a preference to display the host system video data to the management interface.

18. The article of claim 16, the instructions for further causing the processor to set a read/display frame buffer for the video controller to the alternate frame buffer in response to the indication indicating a preference to display the management video data to the management interface.

* * * * *